(12) United States Patent
Coppola

(10) Patent No.: US 6,767,182 B2
(45) Date of Patent: Jul. 27, 2004

(54) DEVICE FOR CONTROLLING THE COOLING FLOWS OF GAS TURBINES

(75) Inventor: Alessandro Coppola, Prato (IT)

(73) Assignee: Nuovo Pignone Holding S.p.A., Florence (IT)

(*) Notice: Subject to any disclaimer, the term of this patent is extended or adjusted under 35 U.S.C. 154(b) by 0 days.

(21) Appl. No.: 10/257,539

(22) PCT Filed: May 15, 2001

(86) PCT No.: PCT/IB01/01297
§ 371 (c)(1),
(2), (4) Date: Oct. 15, 2002

(87) PCT Pub. No.: WO01/88354
PCT Pub. Date: Nov. 22, 2001

(65) Prior Publication Data
US 2003/0147741 A1 Aug. 7, 2003

(30) Foreign Application Priority Data
May 15, 2000 (IT) .................................. MI2000A1061

(51) Int. Cl.[7] ............................................... F01D 9/06
(52) U.S. Cl. ..................... 415/115; 415/142; 415/170.1
(58) Field of Search ................................. 415/115, 142, 415/170.1, 173.1–5, 174.5; 60/757

(56) References Cited

U.S. PATENT DOCUMENTS

| | | | |
|---|---|---|---|
| 3,936,217 A | | 2/1976 | Travaglini et al. |
| 4,246,757 A | * | 1/1981 | Heberling ..................... 60/737 |
| 4,254,618 A | * | 3/1981 | Elovic ....................... 60/226 R |
| 4,302,941 A | * | 12/1981 | Dubell ......................... 60/757 |
| 4,668,162 A | | 5/1987 | Cederwall et al. |
| 4,807,433 A | | 2/1989 | Maclin et al. |
| 5,961,279 A | * | 10/1999 | Ingistov .................... 415/170.1 |

FOREIGN PATENT DOCUMENTS

| | | |
|---|---|---|
| DE | 71 024 A | 1/1970 |
| GB | 2 065 234 A | 6/1981 |

* cited by examiner

Primary Examiner—Edward K. Look
Assistant Examiner—James M McAleenan
(74) Attorney, Agent, or Firm—Nixon & Vanderhye PC

(57) ABSTRACT

The inner barrel of a turbine has a plurality of holes for receiving compressor discharge air and flowing such air within the inner barrel. A plurality of replaceable nozzles having internal bores of different diameters are selectively screw threaded into the openings of the inner barrel body enabling, with different diameters, a variation in the flow of compressor discharge air entering the inner barrel.

9 Claims, 3 Drawing Sheets

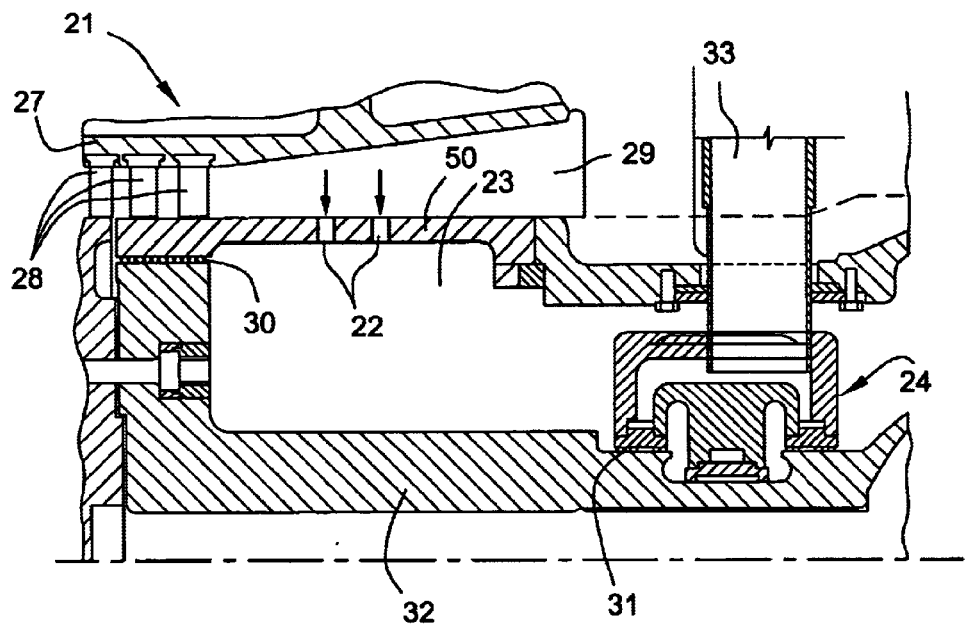
Fig. 3
PRIOR ART
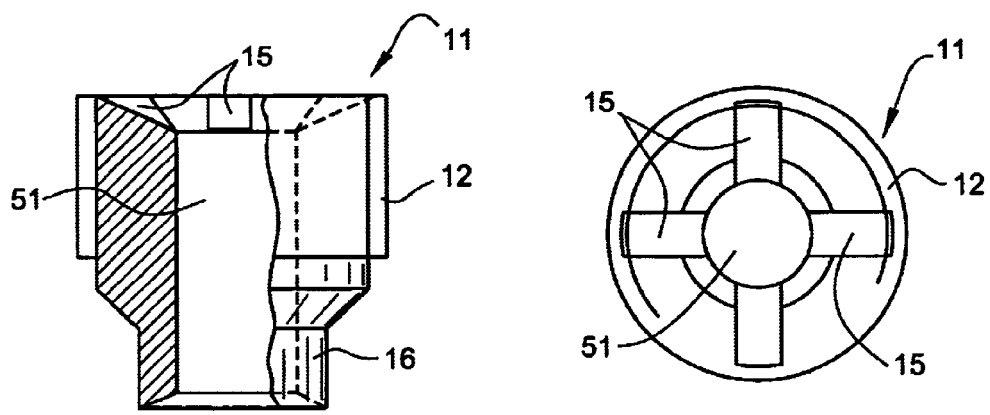
Fig. 4  Fig. 5

DEVICE FOR CONTROLLING THE COOLING FLOWS OF GAS TURBINES

This application is the US national phase of international application PCT/IB01/01297 filed May 15, 2001, which designated the US.

The present invention relates to a device for controlling the cooling flows of gas turbines.

As is known, gas turbines comprise a compressor, to which air is fed from the external environment so as to bring it up to pressure.

The air under pressure passes into a series of combustion chambers which terminate in a nozzle and into each of which an injector feeds fuel which is mixed with the air so as to form a combustible air mixture to be burned.

The turbine converts the enthalpy of the gases combusted in the aforementioned combustion chamber into mechanical energy available for a user.

The present invention refers, in particular, to the outlet zone of the gas turbine compressor.

By way of introduction of the technical problems solved by the present invention, it should be noted that the constant attempt to increase the efficiency of gas turbines is subject to the requirement for optimisation of all the flows inside the turbine engines.

In particular, the air supplied from the compression stages, since it has been produced with considerable expenditure in terms of the thermodynamic cycle, must be used as far as possible for combustion, instead of for cooling or confining functions which moreover are required in the most critical hot zones.

The problem which is posed in this context is therefore that of correct metering of this air in the various zones, taking into account that the amount of air required is variable depending on the operating conditions, the age and the degree of wear or soiling of the turbine engine, its components and the dimensional variations of the components during the transients.

In fact, in the event of an insufficient air flow, the consequences are, at best, a significant reduction in the life of the components with the possibility of blade failure and fires.

It is pointed out here, incidentally, that these factors may have a negative effect resulting in an increase in costs for users.

In order to understand more fully the technical problems involved in the present invention, reference should be made first of all to FIGS. 1 to 3, which show, respectively: a cross-sectional view of a gas turbine according to the prior art, denoted overall by the reference number 20; an enlarged view of the outlet zone of the compressor 21 of the gas turbine 20; and the conventional solution for controlling the cooling flows of the gas turbine 20 which may envisage fixed bores 22 in the body 50 of the inner barrel 23.

In greater detail, FIG. 1 shows a gas turbine 20 provided with a compressor 21 with which an inner barrel 23 and a load-bearing bolster 24 are associated; FIG. 1 also shows, among other things, the rotors 25 and 26 of the turbine 20.

Examining in greater detail FIG. 2, it is possible to see the casing 27 and the blades 28, forming part of the compressor 21, the outlet diffuser 29 of the compressor 21, the venting outlet 33 of the load-bearing bolster 24 and the air seals 30 and 31 of the inner barrel 23; FIG. 2 also shows a portion of the rotor 32.

The solutions currently used for correct metering of the air flows intended for cooling and sealing consist in the specific definition of orifices on the supply tubes/ducts and determination of the degree of play between rotating members and labyrinths formed in complementary stator components.

Orifices and labyrinths (see FIG. 3) are therefore interdependent from a design point of view and precisely determined during finalisation of the prototype, so that extreme situations and deviations in design can be safely handled.

This means that these adjustments and tolerances are therefore defined by the manufacturer during assembly.

However, the need for an increase in the efficiency of the machines on the part of customers has resulted in a reduction in the air flows to the absolute minimum necessary, with the application of seals which are increasingly efficient—often excessively so—with the serious risks mentioned above.

In particular, there has been a tendency to reduce the amount of air which escapes from the compressor 21 towards the innermost portions of the machine 20 (FIGS. 1–2), in particular in the zone located inside the inner barrel 22.

This air, passing through a first barrier of labyrinth seals, then escapes from the vent of the load-bearing bolster 24 of the compressor 21 and through the front interspace of the first turbine rotor, through the labyrinth formed with the angel wings on the shanks of the blades and the stationary seals mounted on the casing.

The function of this air is therefore that of providing a seal from the oil vapours in the bolster 24 and hot gases inside the turbine 20, cooling the turbine disk and removing the heat produced by means of ventilation friction inside the inner barrel 23.

Experience has shown that often, the compromise adopted between the need for an increase in efficiency and reliability of the machine, since there is no possibility for adjustment, has resulted in a sudden reduction in reliability of the machine.

An object of the present invention is therefore to provide a device for controlling the cooling flows of gas turbines which is able to allow the possibility of varying the air flow entering into the inner barrel, without the need for replacement of the latter.

More particularly, the invention aims to avoid any kind of disassembly of the most important components of the turbine engine, while allowing variation in the air flow into the inner barrel.

Another object of the invention is to provide a device for controlling the cooling flows of the gas turbines which allows adjustment which is customized and repeatable over time, by simply stopping the machine and performing simple operations involving the selection and replacement of suitable component parts.

A further final object of the invention is to provide a device for controlling the cooling flows of gas turbines which is advantageous from a cost point of view.

Last but not least, an object of the invention is to provide a device for controlling the cooling flows of gas turbines which is substantially safe and reliable.

These and other objects are achieved by a device for controlling the cooling flows of gas turbines, where the aforementioned gas turbine is provided with a compressor with which an inner barrel and a load-bearing bolster are associated, characterized in that it envisages the arrangement of a plurality of replaceable nozzles which have an internal bore with different diameters and which can be mounted in suitable holes formed in the substantially cylindrical body of the aforementioned inner barrel so as to allow a variation in the flow of air entering into the aforementioned inner barrel, by means of the selection and replacement of at least some of the aforementioned nozzles with other nozzles having an internal bore with suitable diameters.

According to a preferred embodiment of the present invention, each of the aforementioned nozzles has a threaded section able to engage with a corresponding internally threaded section present in a hole formed in the aforementioned inner barrel.

According to a further preferred embodiment of the present invention, each replaceable nozzle has a cylindrical section with a diameter smaller than that of the threaded section and a pair of incisions for engagement with a magnetic-head spanner.

According to another preferred-embodiment of the present invention, the nozzles are inserted by means of a guide tube and a magnetic-head spanner, the guide tube being inserted inside a corresponding hole present in the casing of the aforementioned compressor.

More particularly, the guide tube has a threaded collar for allowing engagement thereof with a corresponding hole present in the casing of the compressor.

The guide tube is inserted into the hole of the compressor casing by sliding it until the aforementioned threaded collar thereof is screwed into the corresponding threading of the compressor casing with its end inside the machine making contact with the aforementioned inner barrel, so as to form a retaining and guiding channel inside which the nozzles to be screwed into the body of the inner barrel can be passed.

According to yet another preferred embodiment of the present invention, during operation of the aforementioned gas turbine, the holes in the compressor casing are closed using bolts, or other similar closing devices, inserted in position after removal of the guide tubes.

The present invention relates, moreover, to the fact that, in order to fix the nozzles in the operating position, it is further envisaged using a dimpling punch, which is used by employing the guide tube as a guide for the striking point.

Further characteristic features of the invention are defined in the claims accompanying the present patent application.

The further objects and advantages of the present invention, as well as its structural and functional characteristics, will emerge clearly from an examination of the description which follows and its accompanying drawings, which are provided purely by way of a non-limiting example and in which:

FIG. 3 shows the conventional solution for controlling the cooling flows of gas turbines, which envisages fixed bores in the body of the inner barrel;

FIG. 4 shows a partially sectioned view of a nozzle forming part of the device for controlling the cooling flows of the gas turbines, according to the present invention;

FIG. 5 shows a top plan view of the nozzle according to FIG. 4;

Figure 1:
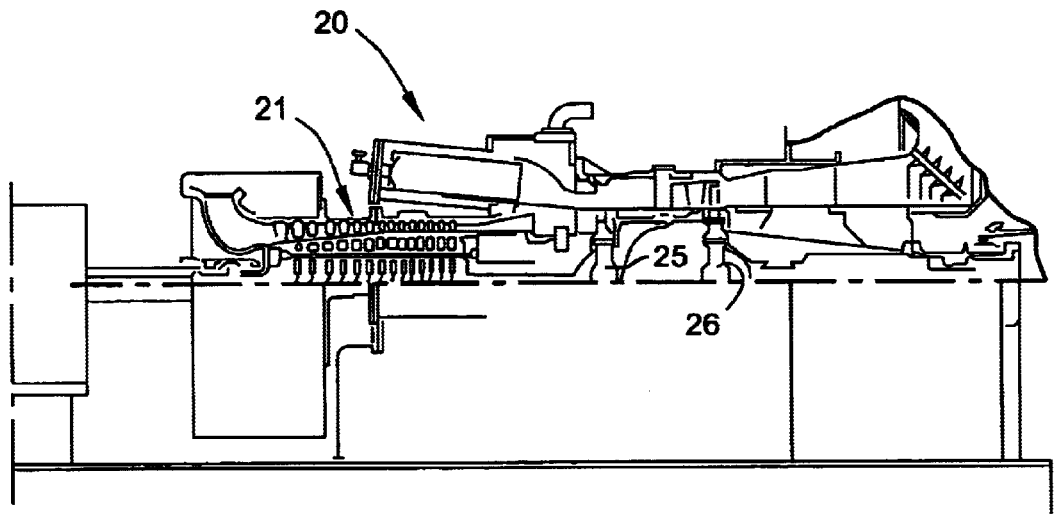
FIG. 1 shows a cross-sectional view of a gas turbine according to the prior art.
Figure 2:
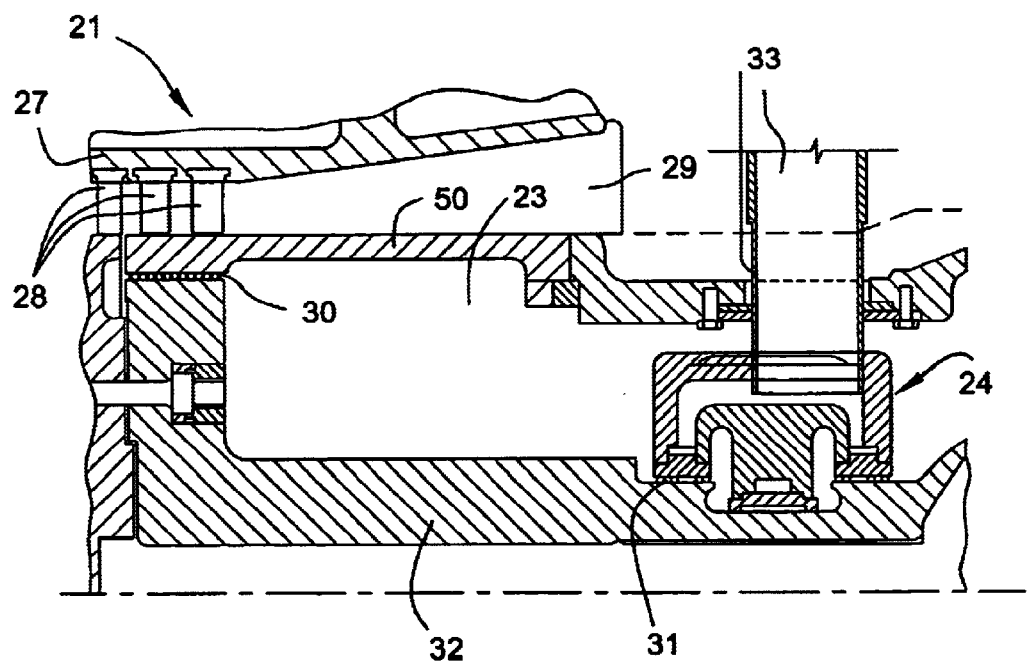
FIG. 2 shows a cross-sectional view of an enlargement of the outlet zone of the compressor of the gas turbine according to FIG. 1.
Figure 6:
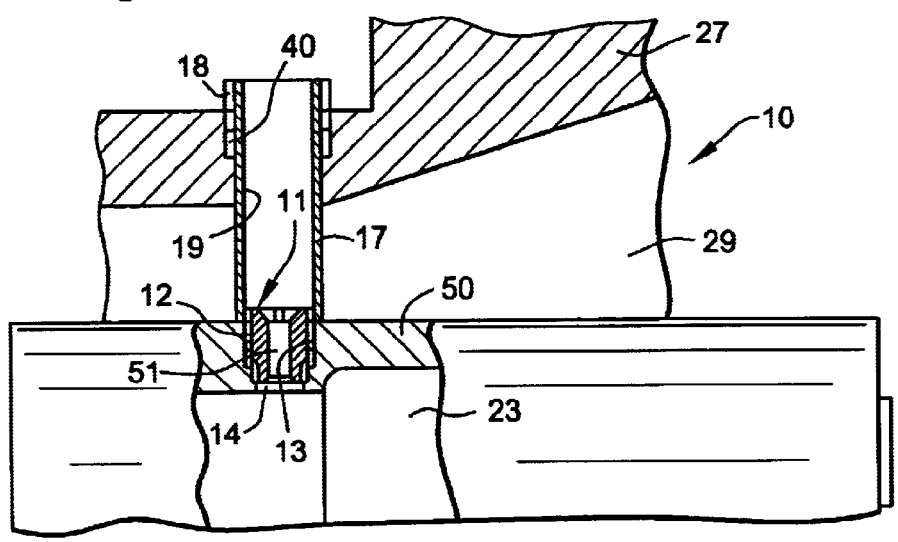
FIG. 6 shows a partially sectioned view of the device for controlling the cooling flows of the gas turbines, according to the present invention, during a first assembly stage.
Figure 7:
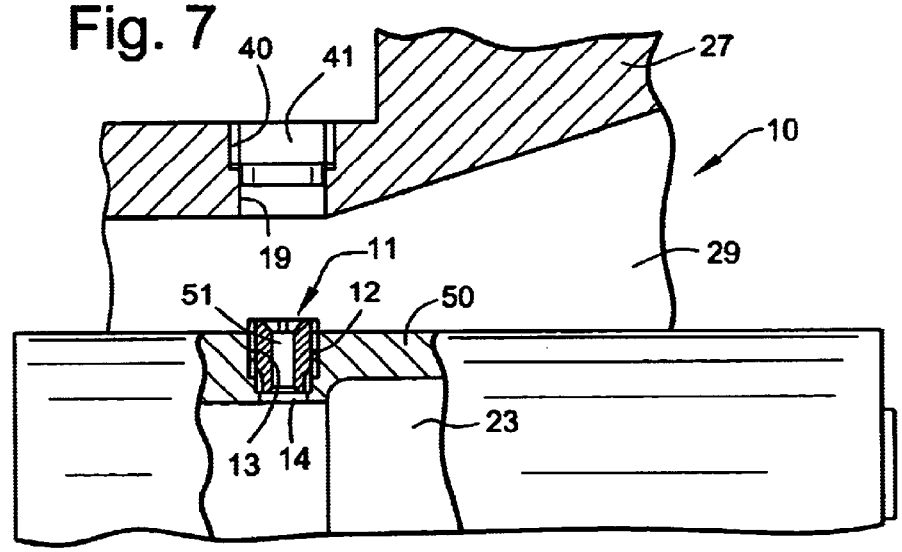
FIG. 7 shows a partially sectioned view of the device for controlling the cooling flows of gas turbines, according to the present invention, in the operationally assembled condition.

With particular reference firstly to FIGS. 6–7, the device for controlling the cooling flows of gas turbines, according to the present invention, is denoted overall by the reference number 10.

The device 10 comprises a plurality of replaceable nozzles 11 which can be mounted in suitable holes 14 formed in the body 50 of the inner barrel 23.

With reference to FIGS. 4–5, the nozzle 11 has a threaded section 12 able to engage with a corresponding internally threaded section 13 present in the hole 14.

The nozzle 11 also has a cylindrical section 16 with a diameter smaller than the diameter of the threaded section 12 and the diameter of the innermost smooth section 14, and a pair of incisions 15 for engagement with a magnetic-head spanner.

The invention also envisages the use of a special tool formed by a guide tube 17 and by the magnetic-head spanner.

The use of a dimpling punch is also envisaged.

The guide tube 17 also has a threaded collar 18 allowing engagement thereof with a corresponding hole 19 present in the casing 27 of the compressor 21.

The hole 19 therefore has an internally threaded section 40.

As regards that stated above, the machining operations which must be carried out on the gas turbine 20 consist in the boring and threading of the external casing 27 of the compressor 21 and the boring and threading of the inner barrel 23.

Once the useful area necessary for a nominally correct value of air to be admitted into the inner barrel 23 has been defined, this area is divided up into a suitable number of nozzles 11 with cross-sections of suitable diameter, to be screwed onto the cylindrical body 50 of the inner barrel 23 radially inside suitable threaded bores 14.

Opposite these bores 14, a corresponding number of threaded radial bores are formed in the casing 27 of the compressor 21, having the function of providing access to the replaceable nozzles 11 from the outside.

During operation of the gas turbine 20, these holes 19 are closed by bolts 41 and other similar closing devices.

The replaceable nozzles 11 obviously have internal bores 51 of suitable diameter.

The replaceable nozzles 11 are in fact provided in the form of sets or kits, with various diameters of the internal bore 51, the average value of which corresponds to the nominally optimum design diameter.

Once the gas turbine 20 has been started using this initially attempted diameter, the diameter which is most appropriate on the basis of the readings provided by the machine instrumentation is then chosen.

The special tool for mounting the replaceable is nozzles consists, as already mentioned, of a guide tube 17 and an insertable spanner which is provided with a special magnetic cross head.

The guide tube 17 has two ends provided with a flat cut perpendicular to the axis and a threaded collar 18 at one end, with a threading similar to that of the holes 19 for access to the casing 27 of the compressor 21.

From an operational point of view, the guide tube 17 is inserted into the hole 19 of the casing 27 by sliding it until its threaded collar 18 is screwed into the corresponding threading of the casing 27.

This operation brings the end inside the machine into contact with the inner barrel 23 so as to form a retaining and guide channel inside which the nozzles 11 to be screwed into the body 50 of the inner barrel 23 can be passed.

Therefore, after insertion of the magnetic head spanner, the nozzles 11 are removed and inserted.

Once the replacement operation has been completed, the replaceable nozzles 11 must be fixed by means of dimpling, using the tube of the special tool, i.e. the guide tube 17, as a guide for the striking point.

After this operation has been completed, the guide tube 17 is then unscrewed and the screw plugs 41 are inserted in place of them, inside the hole 19, by means of the internal thread 40.

The spanner has a magnetized head so as to be able to work easily with any angle of inclination.

The theoretical and experimental results have been so satisfactory as to demonstrate that the system may be used on gas turbines which are widely used.

Therefore, the solution proposed has the aim of being able to vary the flow of air entering into the inner barrel 23, without the need for replacement of the latter or in any case without the disassembly of any important component of the turbine engine, but by means of simple access to the replaceable nozzles 11 using a special tool, i.e. the guide tube 17, via holes 19 which are normally closed.

This is such as to allow adjustment which is customised and repeatable over time by simply stopping the machines 20 and replacing the appropriate calibrated nozzles 11.

From the description given the characteristic features of the device for controlling the cooling flows of gas turbines forming the subject of the present invention clearly emerge, as do the advantages thereof.

The following final comments and observations are added here so as to define the aforementioned advantages with greater precision and clarity.

As a result of the invention described it is possible to vary the flow of air entering into the inner barrel 23 by simply gaining access to the removable nozzles 11 using a special tool, via holes 19, which are normally closed.

This feature allows adjustment which is customised and repeatable over time, by simply stopping the machines and performing replacement with the appropriate calibrated nozzles.

It is obvious that numerous variations may be made to the device for controlling the cooling flows of gas turbines, according to the present invention, without thereby departing from the novel features of the inventive idea described.

Finally it is obvious that, in the practical embodiment of the invention, the materials, forms and dimensions of the details illustrated may be of any kind, depending on requirements, and that they may be replaced with others which are equivalent from a technical point of view.

The scope of the invention is defined by the accompanying claims.

What is claimed is:

1. A device for controlling the cooling flow of a gas turbine comprising:
    a compressor having an inner barrel including a cylindrical body and a plurality of openings through the cylindrical body of the inner barrel in communication with compressor discharge air and flowing compressor discharge air into the inner barrel;
    a plurality of replaceable nozzles having internal bores of different diameters relative to one another and mountable in said holes to enable a selective variation in the flow of compressor discharge air into the inner barrel in response to selection and replacement of one or more of said nozzles with one or more other nozzles respectively having internal bores of different diameter.

2. A device according to claim 1 wherein each of said nozzles includes a threaded section for threaded engagement with a corresponding internally threaded section of a corresponding hole formed in the inner barrel body.

3. A device according to claim 2 wherein each of said replaceable nozzles includes a cylindrical section having a diameter smaller than that of said externally threaded section of said nozzle.

4. A device according to claim 2 wherein each of said replaceable nozzles has a pair of incisions for engagement with a magnetic head spanner.

5. A device according to claim 1 including a guide tube and a magnetic head spanner, said compressor including an outer casing, said guide tube being receivable through a hole in said casing.

6. A device according to claim 5 wherein said hole through said casing has female threads, said guide tube having a male threaded collar for threaded engagement with the female threaded hole of the casing.

7. A device according to claim 6 wherein said guide tube is threaded into said hole of said casing and has a distal end for contact with the inner barrel body to form a retaining and guide channel, said nozzles being receivable through said channel for threaded engagement with the holes through the inner barrel body.

8. A device according to claim 7 wherein said nozzles are staked to said inner barrel body by a dimpling punch received through said guide tube.

9. A device according to claim 6 wherein during operation of the gas turbine, closure devices are mounted in said holes through said outer casing upon removal of said guide tube to close the outer casing holes.

* * * * *